No. 892,846.  
PATENTED JULY 7, 1908.  
R. JORGENSEN.  
COFFEE PERCOLATOR AND STRAINER.  
APPLICATION FILED JUNE 13, 1906.

Witnesses  
Frank B. Hoffman  
D. W. Gould

Inventor  
R. Jorgensen  
By Victor J. Evans  
Attorney

UNITED STATES PATENT OFFICE.

RASMUS JORGENSEN, OF SEATTLE, WASHINGTON.

COFFEE PERCOLATOR AND STRAINER.

No. 892,846.  Specification of Letters Patent.  Patented July 7, 1908.

Application filed June 13, 1906. Serial No. 321,489.

*To all whom it may concern:*

Be it known that I, RASMUS JORGENSEN, a subject of the King of Denmark, residing at Seattle, in the county of King and State of Washington, have invented new and useful Improvements in Coffee Percolators and Strainers, of which the following is a specification.

The invention relates to an improvement in coffee-percolators and strainers designed primarily for use in connection with coffee urns used in hotels, restaurants and the like.

The main object of the present invention is the production of a simple device of this character which may be readily applied to or removed from the urn, and which is so constructed as to provide for the ready insertion and removal of he material and the convenient cleansing of the device.

The invention will be described in the following specification, reference being had particularly to the accompanying drawings, in which:—

Figure 1:
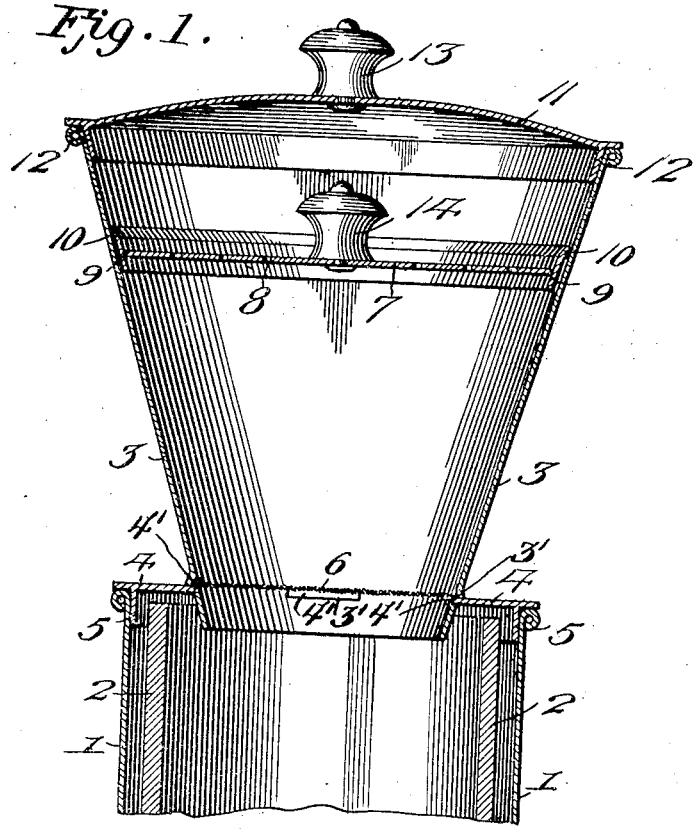
Figure 2:
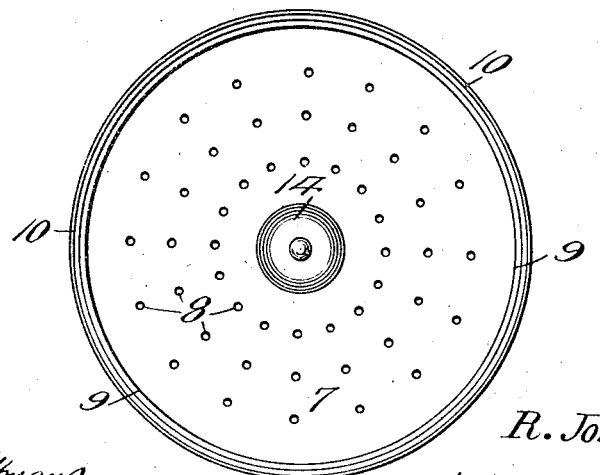

Figure 1 is a vertical sectional view of my improved strainer, showing the same in applied position, Fig. 2 is a plan of the water plied distributer used in connection with my device.

Referring particularly to the drawings my improved strainer is designed for use with coffee urns of the class described, and which in ordinary construction comprises a jacket 1, closed at bottom and open at top, within which is disposed a receptacle 2 of earthenware or the like, adapted to contain the coffee and connected at the lower end with a suitable discharge faucet leading through the jacket. The jacket and receptacle are ordinarily separated by an annular space, which when the urn is in use is filled with water or the like.

The strainer of the present invention comprises a conical body 3, open at top and bottom and provided near the lower or small end with a circumferentially arranged laterally extending flange 4. At its juncture with the flange the body 3 is offset at determinate points in a horizontal plane to form openings 3', the flange being provided at its inner edge with projections 4' to fit within the openings 3' formed by the offsets. The flange is equal in diameter to the full diameter of the jacket 1, and is provided near its free edge with a depending annular lip 5, designed to fit snugly within the upper end of the jacket to support the strainer in position thereon. As before stated the strainer body 3 projects below the flange 4, so that when said strainer is in applied position the free lower end of the strainer body extends within the plane of the receptacle 2.

A section of any desired straining material, as 6, is disposed transverse the strainer body above the lower end thereof, preferably in alinement with the flange 4 and resting on the projections 4' of the flange. A water distributer 7 is also arranged for coöperation with the strainer, said distributer comprising a disk-like body perforated in regular series, as at 8, and formed with an edge flange 9, preferably projecting above and below the disk and at an angle thereto in accordance with the angular relation of the sides of the body. The upper edge of the flange 9 is preferably flared to a slight degree, as at 10, whereby to provide a more or less tight joint between said flange and the interior surface of the body. The disk 7 is of such diameter relative to the body of the strainer as to cause said disk to engage the converging wall of the strainer at a point slightly below the upper edge thereof, whereby in effect to divide the strainer body into two compartments the larger of which is between the distributer and the straining medium 6. The strainer body is provided with a suitable cover 11 having an edge flange 12 to fit within the upper edge of the body, said cover, as well as the distributer 7 being provided with handles 13 and 14 respectively for convenience in removal.

In use coffee is placed within the body, resting directly upon the straining medium 6. The water distributer is now inserted within the body being moved downward within the same until the edge flange frictionally engages the wall of the flange. Water heated to the desired degree is poured onto the distributer, and finds its way through the openings 8 onto the coffee, percolating therethrough and through the straining medium 6 into the receptacle. The use of the distributer 7 provides for a convenient distribution of the water throughout the surface of the material, thereby insuring that all of the material be effectively reached by the water. The distributer may be readily removed from the body to permit a cleansing of the strainer and the removal of the coffee grounds supported on the straining medium. The flange 4 of the strainer provides a cover for the otherwise exposed open ends of the receptacle and jacket, aiding in retaining the strength of the coffee during the course of making, while at the same time providing a steady support for the strainer.

The convenience of application of the strainer, as well as the ease with which the coffee grounds may be removed and fresh material inserted, and the ready separation of the distributer to permit a thorough cleansing of the device, provides a device primarily adapted for the making of coffee in large quantities with the absolute cleanliness necessary in such operation.

The strainer as a whole may be ornamented to any degree desired and is designed to normally remain in applied position with relation to the urn, it being understood that the making of coffee in this particular manner requires that the fluid be passed successively through the material in order to gain the full strength. In this connection it is to be noted that the strainer, and contained material is supported wholly above the receptacle, leaving the full capacity of the latter for the reception of the fluid, wherein the invention is a material improvement over other devices for this purpose now in use.

Having thus described the invention what is claimed as new, is:—

A strainer for use with coffee urns comprising a conical body open at both ends, the wall of the body near its lower end being formed with offsets, an annular flange fitting within the offset portions of the body wall and projecting beyond said wall to form a cover for the coffee urn, a screen seated upon those portions of the flange projecting within the offset portions of the body wall, and a water distributer comprising an annular band of conical form, the upper edge of the band being flaring to engage the inner surface of the wall of the body and support the remainder of the band spaced from said wall, and a perforate distributer plate secured within the band.

In testimony whereof, I affix my signature in presence of two witnesses.

RASMUS JORGENSEN.

Witnesses:
H. S. FRYE,
H. B. HOYT.